(12) United States Patent
Asaro et al.

(10) Patent No.: US 11,836,091 B2
(45) Date of Patent: Dec. 5, 2023

(54) SECURE MEMORY ACCESS IN A VIRTUALIZED COMPUTING ENVIRONMENT

(71) Applicants: ADVANCED MICRO DEVICES, INC., Santa Clara, CA (US); ATI TECHNOLOGIES ULC, Markham (CA)

(72) Inventors: Anthony Asaro, Markham (CA); Jeffrey G. Cheng, Markham (CA); Anirudh R. Acharya, San Diego, CA (US)

(73) Assignees: Advanced Micro Devices, Inc., Santa Clara, CA (US); ATI TECHNOLOGIES ULC, Markham (CA)

( * ) Notice: Subject to any disclaimer, the term of this patent is extended or adjusted under 35 U.S.C. 154(b) by 114 days.

(21) Appl. No.: 16/176,431

(22) Filed: Oct. 31, 2018

(65) Prior Publication Data

US 2020/0133878 A1  Apr. 30, 2020

(51) Int. Cl.
*G06F 12/10* (2016.01)
*G06F 9/455* (2018.01)
*G06F 12/1009* (2016.01)

(52) U.S. Cl.
CPC ...... *G06F 12/1009* (2013.01); *G06F 9/45558* (2013.01); *G06F 2009/45583* (2013.01); *G06F 2212/657* (2013.01)

(58) Field of Classification Search
CPC ............ G06F 12/1009; G06F 9/45558; G06F 2009/45583; G06F 2212/657
See application file for complete search history.

(56) References Cited

U.S. PATENT DOCUMENTS

| | | | |
|---|---|---|---|
| 2014/0082253 A1* | 3/2014 | Macpherson | G06F 9/06 711/6 |
| 2015/0128137 A1 | 5/2015 | Yamaguchi | |
| 2015/0242319 A1 | 8/2015 | Evans et al. | |
| 2016/0188452 A1* | 6/2016 | Almasi | G06F 3/0689 711/6 |
| 2017/0249106 A1 | 8/2017 | Apfelbaum et al. | |
| 2018/0052776 A1* | 2/2018 | Zhao | G06F 12/109 |
| 2018/0060245 A1 | 3/2018 | Tsirkin et al. | |

(Continued)

OTHER PUBLICATIONS

International Search Report and Written Opinion dated Oct. 4, 2019 for International Application No. PCT/US2019/037950, 11 pages.

(Continued)

*Primary Examiner* — Masud K Khan

(57) ABSTRACT

A processor supports secure memory access in a virtualized computing environment by employing requestor identifiers at bus devices (such as a graphics processing unit) to identify the virtual machine associated with each memory access request. The virtualized computing environment uses the requestor identifiers to control access to different regions of system memory, ensuring that each VM accesses only those regions of memory that the VM is allowed to access. The virtualized computing environment thereby supports efficient memory access by the bus devices while ensuring that the different regions of memory are protected from unauthorized access.

20 Claims, 6 Drawing Sheets

(56) References Cited

U.S. PATENT DOCUMENTS

| | | |
|---|---|---|
| 2018/0095898 A1 | 4/2018 | Khosravi et al. |
| 2018/0107608 A1 | 4/2018 | Kaplan et al. |
| 2018/0136967 A1 | 5/2018 | Asbe et al. |
| 2018/0267819 A1* | 9/2018 | Dabak .................. G06F 9/45558 |
| 2018/0307622 A1 | 10/2018 | Smith et al. |
| 2020/0050364 A1* | 2/2020 | Gilbert .................. G06F 3/0673 |

OTHER PUBLICATIONS

International Preliminary Report on Patentability dated Apr. 27, 2021 for International Application No. PCT/US2019/037950, 8 pages.

Office Action issued in Japanese Application No. 2021-523799, dated Jun. 13, 2023, 7 pages.

Kergel, Andy et al. "Virtualizing IO Through The IO Memory Management Unit (IOMMU)", Jan. 1, 2016, pp. 324 pages.

European Search Report dated Jun. 1, 2022 for PCT Application No. PCT/US2019/037950, 12 pages.

Office Action dated Dec. 9, 2022 for Indian Patent Application 202117021861, 7 pages.

* cited by examiner

SECURE MEMORY ACCESS IN A VIRTUALIZED COMPUTING ENVIRONMENT

BACKGROUND

In a virtualized computing environment, multiple virtualized entities, referred to as virtual machines (VM), share computer resources while appearing or interacting with users as individual computer systems. For example, a server can concurrently execute multiple VMs, whereby each of the multiple VMs behaves as an individual computer system but shares resources of the server with the other VMs. Virtualized computing environments support efficient use of computer resources, but also require careful management of those resources to ensure secure and proper operation of each of the VMs. For example, a virtualized computing environment typically manages access to system memory on behalf of the VMs to ensure that VMs do not inadvertently or maliciously access data of other VMs. However, conventional memory access techniques for virtualized computing environments are inefficient, particularly in allowing bus devices (devices coupled to an interconnect of the system) to directly access memory.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
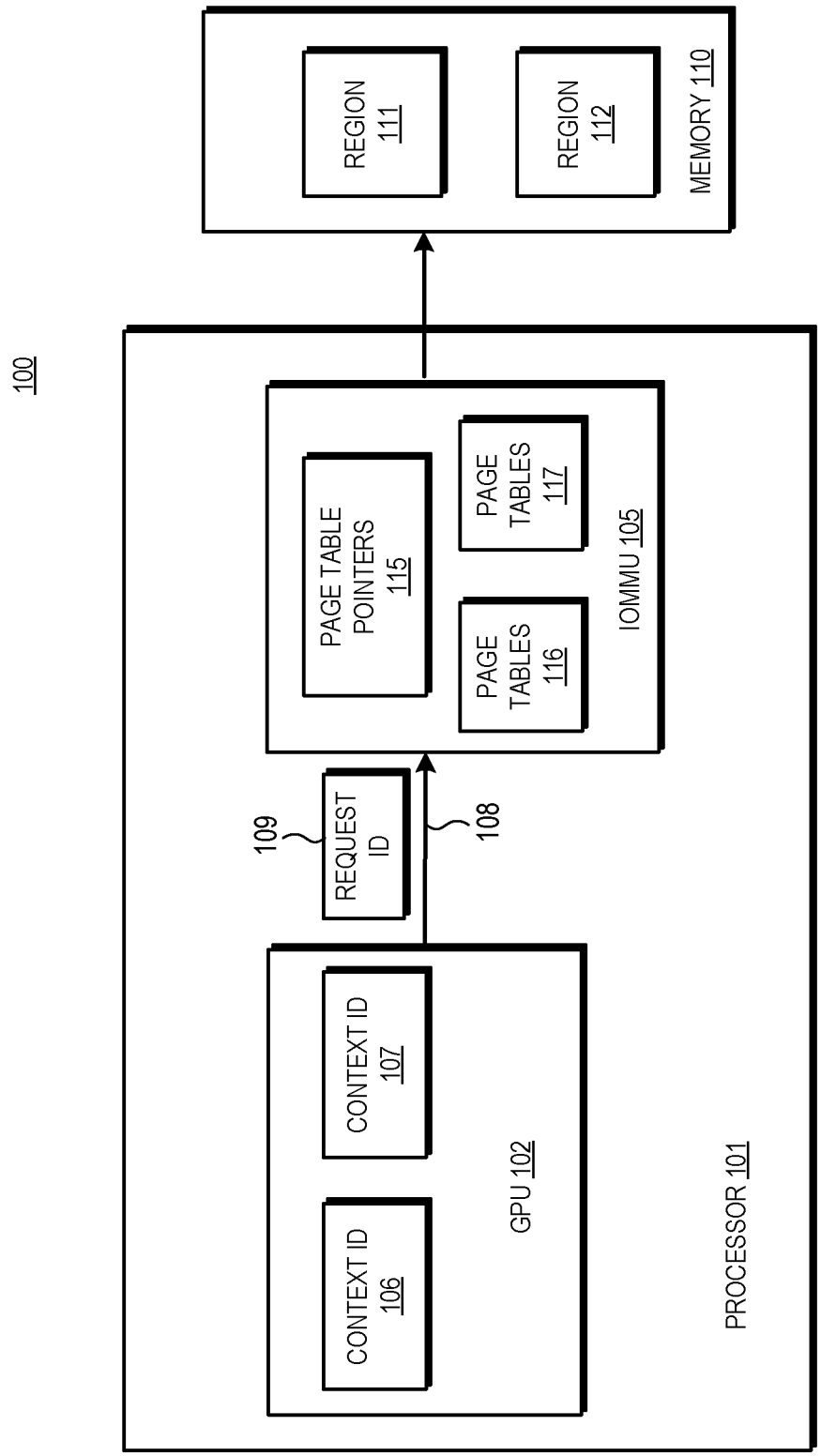
FIG. 1 is a block diagram of a processing system that employs different request identifiers for different virtual machines to support bus devices access to memory in accordance with some embodiments.

FIGS. 1-6 illustrate techniques for supporting secure memory access in a virtualized computing environment by employing requestor identifiers at bus devices (such as a graphics processing unit) to identify the virtual machine associated with each memory access request. The virtualized computing environment uses the requestor identifiers to control access to different regions of system memory, ensuring that each VM accesses only those regions of memory that the VM is allowed to access. The virtualized computing environment thereby supports efficient memory access by the bus devices while ensuring that the different regions of memory are protected from unauthorized access.

To illustrate via an example, in some embodiments a graphics processing unit (GPU) of a processor interfaces with system memory via an input-output memory management unit (IOMMU). The processor concurrently executes multiple VMs, and each VM uses the GPU to execute specified operations. For memory accesses resulting from these operations, the GPU generates memory access requests, and includes with each memory access request a request identifier indicating the VM associated with the request. In response to receiving a memory access request, the IOMMU identifies, based on the request identifier, a pointer to a set of page tables, and uses the set of page tables to identify a system memory address for the memory access request. The page tables are set up by a hypervisor so that each VM is only able to access a corresponding region of the system memory. The processor thus protects each region of memory from unauthorized access, ensuring secure and proper operation of each VM. In contrast, conventional processors do not support, at a bus device, different requestor identifiers for different VMs, thereby exposing the different memory regions to unauthorized access, or restricting the concurrent use of the bus device by different VMs and thus reducing system efficiency.

In some embodiments, the virtualized computing environment supports handling of interrupts from the GPU or bus device independent of a host operating system (OS) executed at the environment. The GPU is configured to execute tasks on behalf of different concurrently executing guest OSes, with each guest OS associated with a different VM. An interrupt handler maintains a mapping table between each task and the corresponding guest OS. The interrupt handler receives interrupts from the GPU, with each interrupt including a payload with an embedded virtual memory identifier (VMID) identifying the virtual memory associated with the task that generated the interrupt. The interrupt handler dereferences a virtual function identifier (VFID) from the mapping table and based on the VFID provides the interrupt payload to the guest OS corresponding to the VFID. For example, in some embodiments the interrupt with the VMID is provided to the interrupt handler, which maps the VMID to a VFID. The interrupt handler forwards the VFID to a controller, such as a PCIe controller, which maps the VFID to a request ID, and the module processing the interrupt (e.g., the IOMMU) uses the request ID to process the interrupt. The virtualized computing environment thereby supports interrupt handling independent of the host OS, reducing overall interrupt latency.

FIG. 1 is a block diagram of a processing system 100 that employs different request identifiers for different virtual machines to support bus devices access to memory in accordance with some embodiments. The processing system 100 is generally configured to execute sets of instructions (e.g., computer programs) on behalf of an electronic device. Accordingly, in different embodiments the processing system 100 is incorporated in any of a number of different electronic devices, such as a desktop computer, laptop computer, server, smartphone, game console, and the like.

To facilitate execution of the sets of instructions, the processing system 100 includes a processor 101 and a memory 110. In some embodiments, the processor 101 is an accelerated processing unit (APU) configured to execute the sets of instructions, and the memory 110 includes a set of memory modules (e.g., dynamic random-access memory (DRAM) memory modules) that together form the system memory for the processor 100. Thus, the memory 110 stores the data and instructions available for access by the sets of instructions executing at the processor 101.

In the depicted example, the processor 101 includes a graphics processing unit (GPU) 102 and an input/output memory management unit (IOMMU) 105. It will be appreciated that in some embodiments the processor 101 includes additional modules to support execution of instruction, including one or more central processing unit (CPU) cores, a memory controller supporting memory accesses by the CPU cores, one or more caches, one or more input/output modules, and the like. The GPU 102 is generally configured to execute sets of operations, referred to as workloads, in response to receiving the operations from the one or more CPU cores. The sets of operations are generally associated with graphics and vector instructions executing at the processor 101.

The IOMMU 105 is generally configured to provide an interface between select modules of the processor 101, including the GPU 102, and the memory 110. In some embodiments, the IOMMU provides direct memory access (DMA) functionality to the memory 110 for the select modules. Accordingly, the IOMMU 105 is configured to receive memory access requests (read and write requests) from the GPU 102 and other modules, to translate virtual addresses associated with the memory access requests to physical addresses, and to manage provision of the memory access requests with the physical addresses to the memory 110, as well as to manage responses to the provided memory access requests. In some embodiments, the IOMMU 105 is connected to the GPU 102 and the other modules via an interconnect, referred to herein as a bus, that operates according to a specified interconnect protocol, such as the Peripheral Component Interconnect Express (PCI-e) protocol. The modules that provide memory access requests to the IOMMU 105 via the bus are referred to herein as "bus devices". For simplicity, FIG. 1 is described with respect to interactions between the GPU 102 and the IOMMU 105. However, it will be appreciated that the techniques described herein apply, and can be implemented with, any bus device.

In some embodiments, the processing system 100 is employed in environments whereby it is important to secure data associated with one set of instructions from being accessed by other sets of instructions. For example, in some scenarios the processing system 100 is employed in a virtualized computing environment wherein the processing system 100 concurrently executes multiple virtual machines (VM). Allowing a VM at least a subset of the data associated with another VM sometimes causes errors in VM operation or exposes private data to unauthorized access. Accordingly, in the example of FIG. 1 the processing system 100 divides at least a portion of the memory 110 into different regions (e.g., regions 111, 112) and assigns each region to a corresponding VM.

To protect a region of the memory 110 from unauthorized access, the IOMMU 105 employs a different set of page tables (e.g., page tables 116, 117) for each VM. During initialization of a VM, a management entity (e.g., a hypervisor) sets up corresponding page tables, wherein the page tables identify the physical address associated with the virtual addresses used by the VM. The management entity generates the page tables for the VM so that the physical addresses correspond to the region of the memory 110 assigned to that VM. In addition, the management entity creates a set of page table pointers 115, wherein each page table pointer points to a different page table. The page table pointers 115 further include an identifier for each page table pointer that is used by the IOMMU to identify memory access requests targeted to a given set of page tables, as described further below.

The GPU 102 employs context identifiers (e.g., context IDs 106, 107) to manage workloads for the executing VMs. Thus, in response to receiving a workload from a VM, the GPU 102 creates a context ID for the workload. In some embodiments, each context ID itself uniquely identifies the VM that created the workload. In other embodiments, the GPU 102 reuses a given context ID for workloads from different VMs, and identifies the VM that created the workload from a combination of the context ID and other indicators, such as the timing or sequence in which the workload was received. When generating a memory access request for a workload, the GPU 102 identifies the VM that created the workload and includes with the memory access request a request identifier (e.g., request ID 109) that identifies the VM.

In response to receiving a memory access request, the IOMMU 105 uses the request ID to index the set of page table pointers 115 to identify the page tables associated with the VM. The IOMMU 105 performs a page table walk using the identified page table to translate the virtual address of the memory access request to a physical address. The IOMMU 105 then provides the physical address to the memory 110 to satisfy the memory access request at the region assigned to the VM. Thus, by using the request IDs, the processing system 100 allows the GPU 102 (or any bus device) to directly access the memory 110 via the IOMMU 105 while protecting each region of the memory 110 from unauthorized access.

In some embodiments, the processing system 100 utilizes one or more existing bus protocol fields to store the request ID for a memory access request. For example, the PCIE protocol includes a device identifier field to indicate a device that generated a message such as a memory access request. The GPU 102 uses the device identifier field to store the request ID that identifies the VM that generated a memory access request. By using an existing bus protocol field, the implementation of the request ID is simplified.

Figure 2:
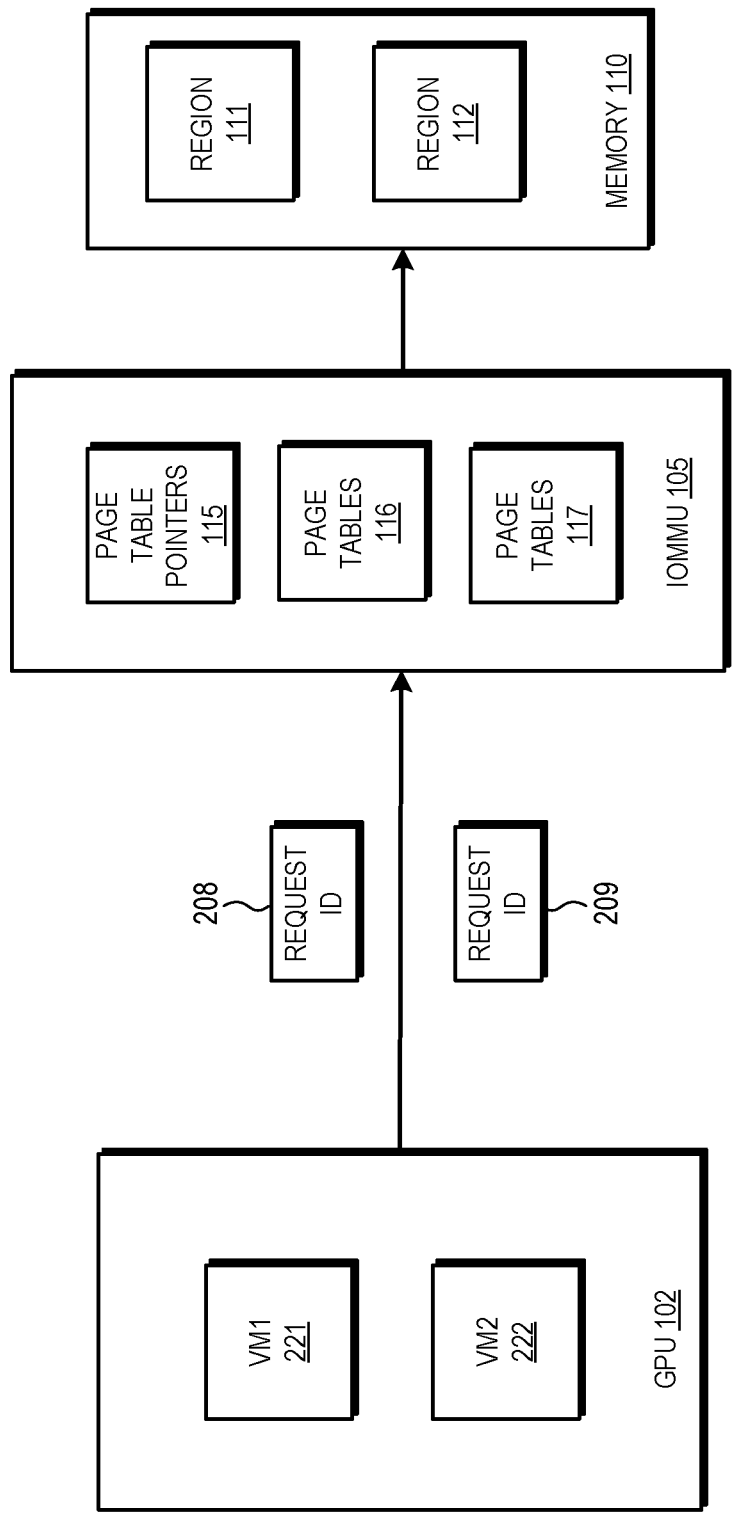
FIG. 2 is a block diagram illustrating an example of different virtual machines executing at the processing system of FIG. 1 accessing memory via a bus device using different request identifiers in accordance with some embodiments.

FIG. 2 is a block diagram of an example of the processing system 100 utilizing different request IDs for memory access requests generated by different VMs in accordance with some embodiments. In the depicted example, the GPU 102 executes different workloads generated by two different VMs, designated VM 221 and VM 222. During provisioning of the VM 221, a hypervisor assigns the VM 221 a request ID, designated request ID 208. Similarly, during provisioning of the VM 221, a hypervisor assigns the VM 222 a request ID, designated request ID 209. For example, in some embodiments the hypervisor (or other hardware module) maps a VFID for a VM to a request ID using the formula:

$$VFi\_ReqID = PF\_ReqID + VF\_OFFSET + VF\# * VF\_STRIDE$$

where VF_OFFSET and VF_STRIDE are values that are used to index a linked list of VFs associated with a given physical function.

In addition, it is assumed for the purposes of the example of FIG. 2 that during provisioning the hypervisor assigns the region 111 of the memory 110 to VM 221, and assigns the region 112 to the VM 222. Accordingly, during provisioning of the VM 221 the hypervisor generates page tables 116 for VM 221, such that the physical addresses stored at the page tables 116 correspond to the region 111. Similarly, the hypervisor generates the page tables 117 for VM 222, such that the physical addresses stored at the page tables 116 correspond to the region 111.

In operation, the GPU 102 generates memory access requests based on workloads generated by the VM 221 and based on workloads generated by the VM 222. In response to generating a memory access request for a workload generated by the VM 221, the GPU includes the request ID 208 with the memory access request. Similarly, in response to generating a memory access request for a workload generated by the VM 222, the GPU includes the request ID 209 with the memory access request.

In response to receiving a memory access request, the IOMMU 105 indexes the page table pointers 115 using the request ID received with the memory access request. Thus, for memory access requests including request ID 208, the IOMMU 105 indexes the page table pointers 115 to retrieve a pointer to the page tables 116. For memory access requests including request ID 209, the IOMMU 105 indexes the page table pointers 115 to retrieve a pointer to the page tables 117. The IOMMU 105 performs a page walk of the page tables indicated by the retrieved pointer, thereby translating the virtual address received with the memory access request to a physical address. The physical address corresponds to one of the regions 111 and 112, depending on the VM associated with the memory access request.

Figure 3:
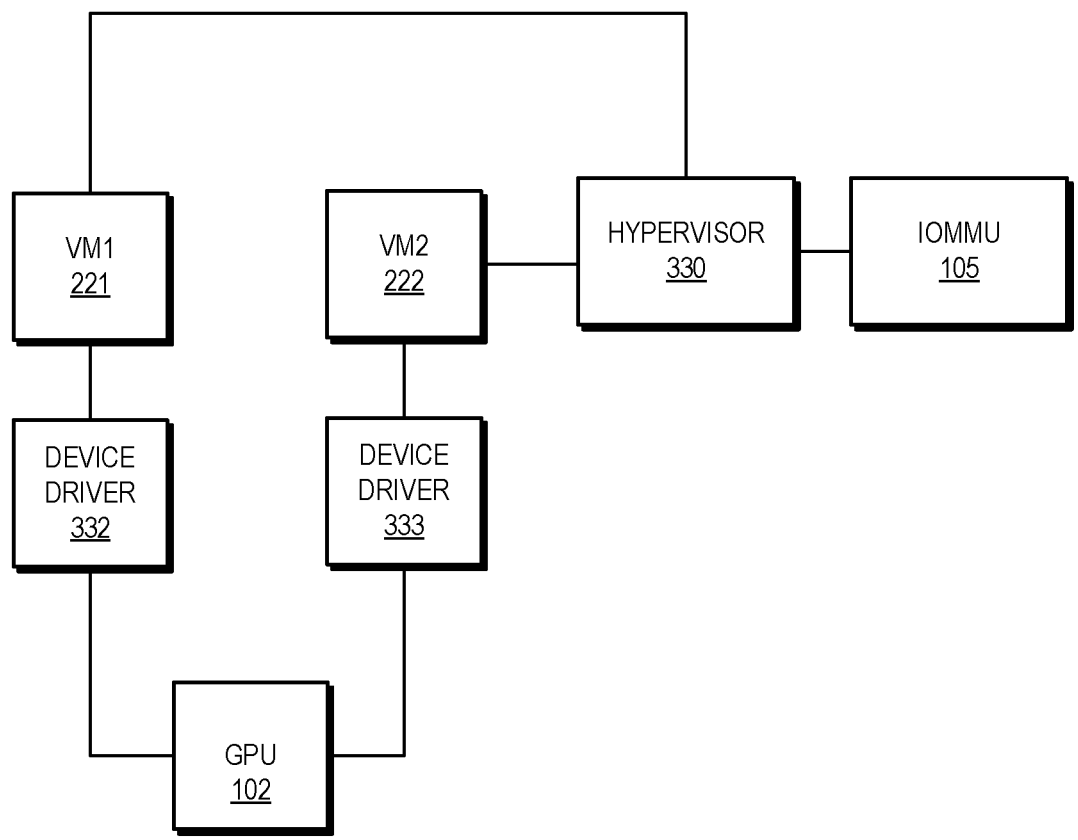
FIG. 3 is a block diagram illustrating an example of the processing system of FIG. 1 employing device drivers and a hypervisor to support secure memory access for different virtual machines in accordance with some embodiments.

FIG. 3 is a block diagram illustrating an example of the processing system 100 employing device drivers and a hypervisor to support secure memory access for different virtual machines in accordance with some embodiments. In the depicted example, the processing system executes a hypervisor 330 that is generally configured to manage provisioning and execution of virtual machines at the processing system 100. In different embodiments, the hypervisor 330 is software, hardware, or a combination thereof.

As referred to above, the hypervisor 330 is generally configured to manage provisioning of VMs at the processing system 101. Accordingly, in response to receiving a request to initiate execution of a VM, the hypervisor 330 manages generation of page tables for the VM to be stored at the IOMMU 105, as well as generation of a page table pointer to point to the generated page tables. A driver (not shown) manages mapping of VMIDs to VFIDs, and the hypervisor 330 manages generation of a request ID from VFIDs according to the formula set forth above. The hypervisor 330 further ensures that the request ID for the VM is associated with the corresponding page table pointer at the IOMMU 105.

In the example of FIG. 3, the processing system 100 executes device drivers 332 and 333. Each of the device drivers 332 and 333 provides a software interface between the GPU and a corresponding VM (VMs 221 and 222, respectively). Accordingly, each of the device drivers 332 and 333 receive requests to execute workloads from the corresponding VM, translate the requests into one or more commands formatted according to the particular type of the GPU 102. The device drivers 332 and 333 also receive messages from the GPU 102, such as messages indicating the results of workloads executed by the GPU 102. The device drivers 332 and 333 translate the messages (or data payloads thereof) into formats expected by the corresponding VM, and provide the translated information to the VM.

In some embodiments, the GPU 102 identifies the request ID for a memory access request based on the device driver that provided the workload or command. In particular, because each device driver 332 and 333 is uniquely associated with a different VM 221, 222, the GPU 102, in effect, identifies the VM that provided the workload or command by identifying the device driver that provided the workload or command. Based on the identified VM, the GPU 102 includes the request ID associated with the identified VM with the memory access request. In some embodiments, the VMs 221 and 222 share a device driver to interface with the GPU 102. Accordingly, with each command or workload provided to the GPU 102, the device driver includes a virtual memory identifier (VMID). The GPU 102 uses the VMID to identify the request ID to be included with each memory access request. In some embodiments, each VMID is uniquely associated with a different VM. In other embodiments, a VMID is shared by multiple VMs, and the GPU 102 identifies the request ID for a VM based on a combination of the VMID and other contextual information, such as when the request ID is being generated, when an interrupt is received, which VMs are presently executing, and the like.

Figure 4:
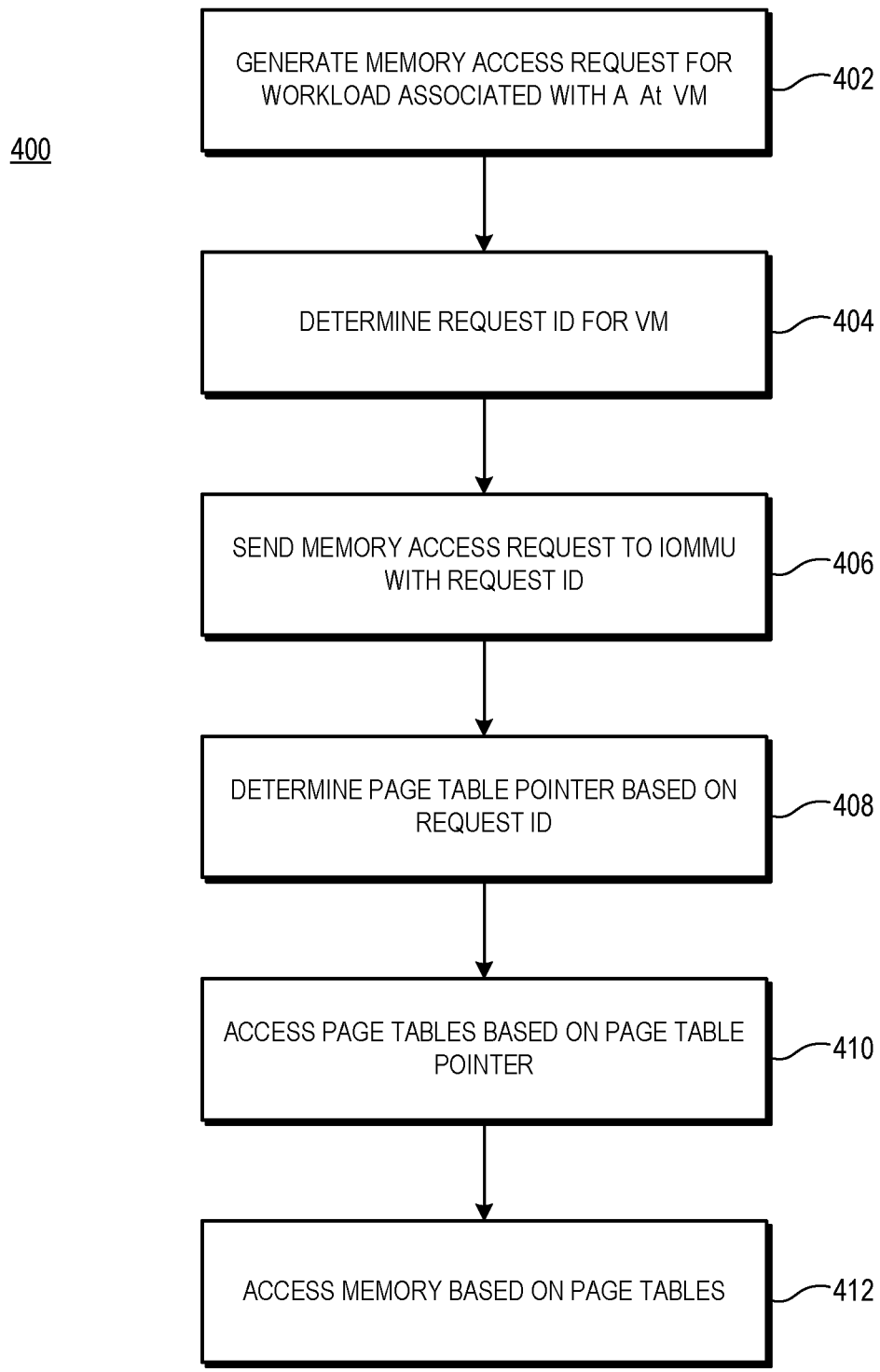
FIG. 4 is a flow diagram of a method of a VM accessing memory via a bus device using a request identifier in accordance with some embodiments.

FIG. 4 is a flow diagram of a method 400 of a VM accessing memory via a bus device using a request identifier in accordance with some embodiments. For purposes of description, the method 400 is described with respect to an example implementation at the processing system 100 of FIGS. 1-3. At block 402, the GPU 102 generates a memory access request based on executing a workload on behalf of a VM. The GPU 102 identifies a context ID for the VM based, for example, on one or more of a device driver that provided the workload, on a VMID for the VM provided by a device driver, or a combination thereof. At block 404 the GPU 102 determines a request ID for the VM based on the context ID.

At block 406 the GPU 102 sends the memory access request to the IOMMU 105, and includes the request ID with the memory access request. For example, in some embodiments the GPU 102 includes the request ID that identifies the VM in a field of the memory access request reserved for a device identifier to identify a device of the processing system 100. At block 408 the IOMMU 105 accesses the page table pointers 115 and identifies a page table pointer for the VM based on the request ID. At block 410 the IOMMU 105 accesses a set of page tables indicated by the page table pointer, and performs a page table walk using the set of page tables to translate a virtual address of the memory access request to a physical address. At block 410 the IOMMU 105 accesses the memory 110 using the physical address. The physical address is located in a region assigned to the VM associated with the memory access request. Thus, each VM accesses only its corresponding region, protecting each VMs data from unauthorized access.

Figure 5:
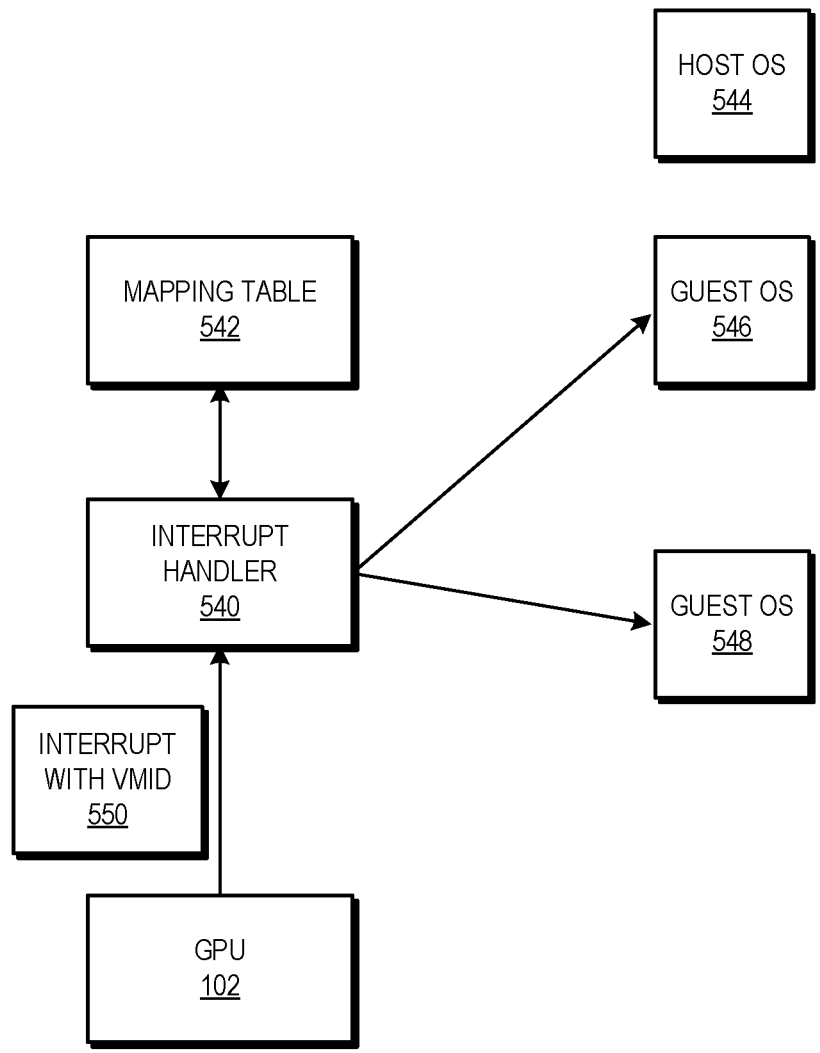
FIG. 5 is a block diagram illustrating an example of the processing system of FIG. 1 handling interrupts independent of a host operating system in accordance with some embodiments.

FIG. 5 is a block diagram illustrating an example of the processing system 100 handling interrupts in accordance with some embodiments. In the depicted example, the processing system 100 concurrently executes a host OS 544, a guest OS 546, and a guest OS 548. Each of the OSes 544, 546, and 548 is executed at one or more processor cores (not shown) of the processing system 100. The host OS 544 is an operating system generally configured to perform operating system functions, such as application and memory management, for the processing system 100. Each of the guest OSes 544 and 546 are configured to perform operating system functions for a different corresponding VM executing at the processing system 100. Thus, for example, in some embodiments the guest OS 546 is an operating system executed by VM 221 (FIG. 2) and the guest OS 548 is an operating system executed by VM 222.

As explained above, in some embodiments each of the VMs 221 and 222 assigns tasks to the GPU 102 for execution, such as drawing tasks, vector calculation tasks, and the like. In the course of executing these tasks, the GPU 102 generates interrupts (e.g., interrupt 550) to asynchronously provide information, such as status information, to the corresponding VM. For example, in some embodiments the GPU 102 generates an interrupt upon completion of a designated task for a VM, with the interrupt including a payload indicating the results of the task or other status information. Conventionally, interrupt handling for concurrently executing VMs is routed through the host OS, or by using specialized hardware. For example, in some processing systems all interrupts are provided first to the host OS, which identifies the VM targeted by the interrupt, and routes the interrupt to the identified VM. However, this approach results in relatively high latency for interrupt handling.

In contrast to the conventional approaches, the processing system 100 employs a mapping table 542 and an interrupt handler 540 to handle interrupts for the guest OSes 546 and 548, independent of the host OS 544. The mapping table 542 indicates, for each VMID, a corresponding VFID, and further indicates a region of the memory 110 (or other memory of the processing system 100) assigned to the VFID. Each interrupt generated by the GPU 102 includes a VMID identifying the VM corresponding to the task that generated the interrupt. In response to receiving an interrupt, the interrupt handler 540 accesses the mapping table 542 to identify the VFID associated with the VMID, and the memory region associated with the VFID. The interrupt handling 540 stores the payload of the interrupt at the indicated memory region, where it is accessed by the corresponding guest OS for provision to an executing application or other module. In some embodiments, the regions are assigned to the VFIDs, during an initialization phase, by the host OS 544 or by a hypervisor of the processing system 100, so that each VM (and corresponding guest OS) is assigned a different memory region, thereby ensuring that a guest OS only has access to the payloads of the interrupts targeted to the VM. That is, a guest OS is not "aware" of the memory regions assigned to other VMs, and therefore is unable to access the interrupt payloads for the other VMs, thereby protecting interrupt payloads from improper access. In some embodiments, the interrupt payload is routed to the VM via the IOMMU 105, and the interrupt itself, or an indicator thereof, is provided to the IOMMU 105 using a different set of tables (not shown) and other interrupt specific mechanisms to inject the interrupt into the VM.

In some embodiments, the interrupt handler 540 handles interrupts for the guest OSes 546 and 548 independently of the host OS 544. That is, the host OS 544 does not handle provision of interrupts, or interrupt payloads, to the guest OSes 546 and 548. The processing system 101 thereby reduces the latency associated with interrupt handling for virtual machines.

Figure 6:
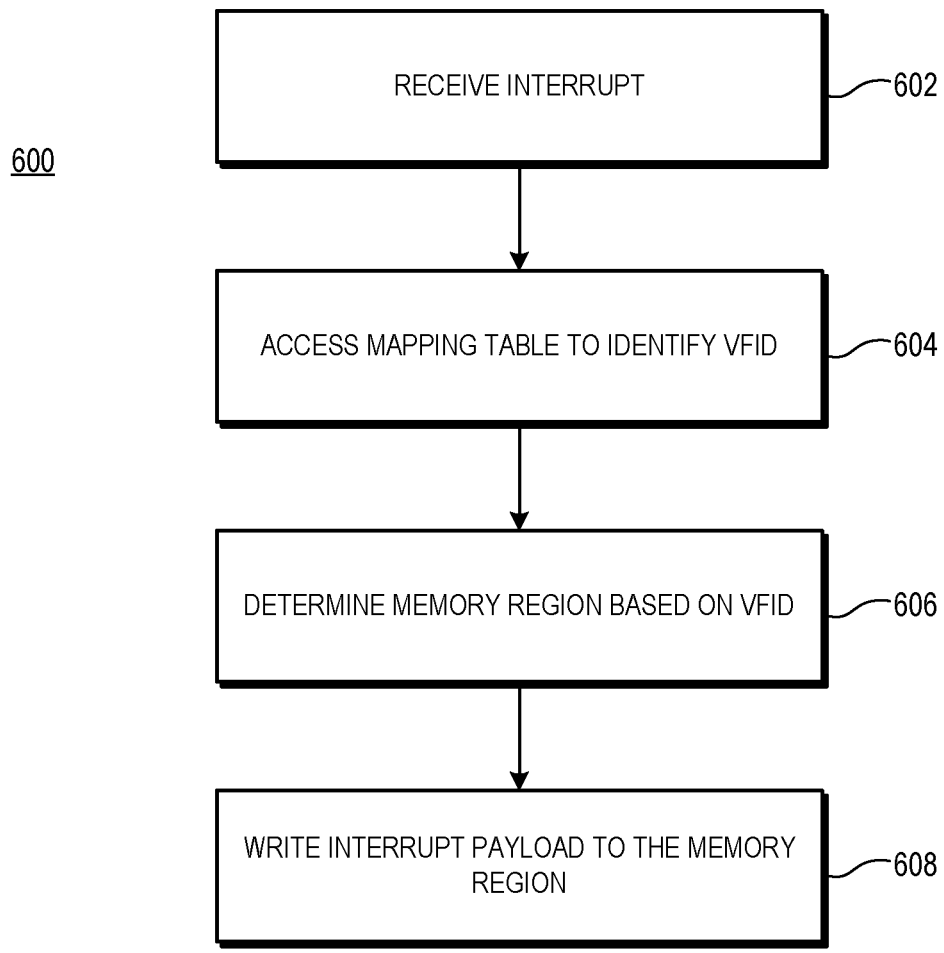
FIG. 6 is a flow diagram of a method of the processing system of FIG. 1 handling interrupts independent of a host operating system in accordance with some embodiments.

FIG. 6 is a flow diagram of a method 600 of handling interrupts for VMs at a processing system independent of a host OS in accordance with some embodiments. The method 600 is described with respect to an example implementation at the processing system of FIG. 1 and FIG. 5. At block 602, the interrupt handler 540 receives the interrupt 550 from the GPU 102. In response, at block 604 the interrupt handler 540 accesses the mapping table 542, using the VMID included with the interrupt 550. The mapping table indicates the VFID associated with the interrupt and, at block 606, indicates the memory region corresponding to the VFID. At block 608, the interrupt handler 540 stores the data payload of the interrupt 550 at the indicated memory region, and indicates to the guest OS corresponding to the VFID that an interrupt has been received. In response, the guest OS accesses the data payload stored at the memory region.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   receiving at an input/output memory management unit (IOMMU) a first memory access request from a bus device, the first memory access request comprising a first memory address and a first request identifier indicating a first virtual machine (VM) associated with the first memory access request;
   mapping, at the IOMMU, a virtual memory identifier (VMID) to a virtual function identifier (VFID);
   accessing, by the IOMMU, a first set of page tables based on the mapping, the first set of page tables being exclusively associated with the first VM; and in response to determining at the IOMMU, based on the first set of page tables, that the first virtual machine is authorized to access a first region of memory associated with first memory address, satisfying the first memory access request at a memory.

2. The method of claim 1, wherein mapping the VMID to the VFID comprises mapping the first request identifier the VFID.

3. The method of claim 2, wherein mapping the first request identifier to the VFID comprises mapping based on an offset value that indexes to a linked list of virtual functions.

4. The method of claim 3, wherein mapping the first request identifier to the VFID comprises mapping based on a stride value that indexes to the linked list of virtual functions.

5. The method of claim 4, wherein mapping the first request identifier to the VFID based on the stride value comprises multiplying the stride value with a virtual function number corresponding to the virtual function.

6. The method of claim 1, wherein:
the first request identifier is stored at a field of the memory access request reserved for a device identifier.

7. The method of claim 1, further comprising:
identifying the first request identifier based on a device driver associated with the bus device.

8. The method of claim 1, further comprising:
accessing a set of page tables based on the mapping.

9. The method of claim 1, further comprising:
receiving at the IOMMU a second memory access request from the device, the second memory access request comprising a second memory address and a second request identifier indicating a second virtual machine (VM) associated with the second memory access request; and
in response to determining at the IOMMU, based on mapping a virtual memory identifier (VMID) to a virtual function identifier (VFID), that the second virtual machine is authorized to access a second region of memory associated with first memory address, satisfying the second memory access request at the memory.

10. A method, comprising:
in response to receiving an interrupt from a bus device associated with a first virtual machine, identifying a memory region exclusively assigned to the first virtual machine based on mapping a virtual machine identifier (VMID) associated with the interrupt to a virtual function; and
storing a payload of the interrupt at the memory region.

11. The method of claim 10, further comprising:
retrieving, by a guest operating system, the payload from the memory region.

12. A processor, comprising:
a bus device to execute workloads on behalf of a first virtual machine (VM); and
an input/output memory management unit (IOMMU) configured to:
receive a first memory access request from a bus device, the first memory access request comprising a first memory address and a first request identifier indicating the first VM;
map a virtual memory identifier (VMID) to a virtual function identifier (VFID); and
access a first set of page tables based on the mapping, the first set of page tables being exclusively associated with the first VM; and in response to determining at the IOMMU, based on the first set of page tables, that the first virtual machine is authorized to access a first region of memory associated with first memory address, satisfy the first memory access request at a memory.

13. The processor of claim 12, wherein the IOMMU is configured to map the VMID to the VFID by mapping the first request identifier the VFID.

14. The processor of claim 13, wherein the IOMMU is configured to map the first request identifier to the VFID by mapping based on an offset value that indexes to a linked list of virtual functions.

15. The processor of claim 14, the IOMMU is configured to map the first request identifier to the VFID by mapping based on a stride value that indexes to the linked list of virtual functions.

16. The processor of claim 15, wherein the IOMMU is configured to map the first request identifier to the VFID by multiplying the stride value with a virtual function number corresponding to the virtual function.

17. The processor of claim 12, wherein:
the first request identifier is stored at a field of the memory access request reserved for a device identifier.

18. The processor of claim 12, wherein the bus device is configured to:
identify the first request identifier based on a device driver associated with the bus device.

19. The processor of claim 12, wherein the IOMMU is configured to:
accessing a set of page tables based on the mapping.

20. The processor of claim 12, wherein the IOMMU is configured to:
receive a second memory access request from the device, the second memory access request comprising a second memory address and a second request identifier indicating a second virtual machine (VM) associated with the second memory access request; and
in response to determining, that the second virtual machine is authorized to access a second region of memory associated with first memory address, satisfy the second memory access request at the memory.

* * * * *

UNITED STATES PATENT AND TRADEMARK OFFICE
CERTIFICATE OF CORRECTION

PATENT NO. : 11,836,091 B2  
APPLICATION NO. : 16/176431  
DATED : December 5, 2023  
INVENTOR(S) : Anthony Asaro, Jeffrey G. Cheng and Anirudh R. Acharya Page 1 of 1

It is certified that error appears in the above-identified patent and that said Letters Patent is hereby corrected as shown below:

In the Claims

Column 9 Line 7, Claim 1, please correct "first request identifier the" to be --first request identifier to the--

Column 10 Line 20, Claim 13, please correct "first request identifier the" to be --first request identifier to the--

Signed and Sealed this  
Sixth Day of February, 2024

Katherine Kelly Vidal  
*Director of the United States Patent and Trademark Office*